United States Patent [19]
Gal et al.

[11] Patent Number: 5,729,732
[45] Date of Patent: Mar. 17, 1998

[54] SYSTEM AND METHOD FOR SORTING DATA IN A COMPUTER SYSTEM USING EDGE BUCKETS FOR KEY VALUES HAVING A MAXIMUM AND MINIMUM RANGE WITHIN A SUBINTERVAL

[75] Inventors: Shmuel Gal, Haifa, Israel; Igal Galperin, Cambridge, Mass.; Zvi Yehudai, Haifa, Israel

[73] Assignee: International Business Machines Corporation, Armonk, N.Y.

[21] Appl. No.: 452,590

[22] Filed: May 25, 1995

[30] Foreign Application Priority Data

Sep. 3, 1994 [GB] United Kingdom ............... 9417857

[51] Int. Cl.⁶ .................................................. G06F 17/30
[52] U.S. Cl. ........................ 395/607; 395/621; 395/441
[58] Field of Search ............................ 395/600, 607, 395/621, 441; 364/300, 200, 900; 340/172.5

[56] References Cited

U.S. PATENT DOCUMENTS

| | | | |
|---|---|---|---|
| 4,210,961 | 7/1980 | Whitlow et al. | 395/607 |
| 5,369,622 | 11/1994 | Lee et al. | 395/607 |
| 5,396,622 | 3/1995 | Lee et al. | 395/607 |
| 5,487,164 | 1/1996 | Kirchhofer et al. | 395/607 |
| 5,490,269 | 2/1996 | Cohn et al. | 395/607 |
| 5,577,243 | 11/1996 | Sherwood et al. | 395/607 |
| 5,613,085 | 3/1997 | Lee et al. | 395/441 |

OTHER PUBLICATIONS

Knuth, "The Art of Computer Programming" Sorting and Searching, vol. 3 (1973) pp. 105–139 and pp. 170–174.

C. Hoare, "Algorithm 64, Quicksort", Comm. ACM4 (1961) p. 321.

McGeoch and Tygar, "Optimal Sampling Strategies for Quicksort", Proc. 28 Allerton Conference on Communication Control and Computing (1991) pp. 62–71.

A. C. Kellar, "Sort Process", IBM Technical Disclosure Bulletin vol. 15, No. 3, Aug. 1972 pp. 1009–1011.

Primary Examiner—Thomas G. Black
Assistant Examiner—Charles L. Rones
Attorney, Agent, or Firm—Esther E. Klein

[57] ABSTRACT

A method is described for operating a computer to sort a set of data records each having an associated key for governing the sort process, the method comprising determining a range for the key values by sampling the key values; defining a plurality of buckets, each bucket corresponding to a respective one of a plurality M of subintervals in the range, and two edge buckets for key values outside the range, each subinterval having a respective index; distributing the keys among the buckets by determining directly from each key value the index of the subinterval into which the key value falls; and processing the buckets in sequence in order to sort the records, sorting the keys in each bucket if the bucket contains more than one key.

14 Claims, 4 Drawing Sheets

SYSTEM AND METHOD FOR SORTING DATA IN A COMPUTER SYSTEM USING EDGE BUCKETS FOR KEY VALUES HAVING A MAXIMUM AND MINIMUM RANGE WITHIN A SUBINTERVAL

FIELD OF THE INVENTION

The invention relates to computerized sorting systems and methods in computer systems.

BACKGROUND OF THE INVENTION

The sorting of data is a very important and often used function in data processing systems. Generally, in such systems data is stored in files composed of records and the sorting process is governed by the value of one of the fields of the records, called the key. It is estimated that of the order of 20% of all computer running time is spent sorting. The improvement of the efficiency and speed of sorting methods in computers is therefore of substantial technical importance.

There are a large number of known sorting procedures. A general review of many of the known methods can be found in Knuth 'The Art of Computer Programming—Sorting and Searching', vol 3, (1973).

One popular sorting method which has been in use since the 1960's is known as Quick-Sort and is described in detail in C A R Hoare, 'Algorithm 64, Quicksort', Comm ACM 4 (1961) p321.

Statistical sampling for finding the best pivot element in order to improve the performance of Quicksort has been proposed by Mcgeoch and Tygar 'Optimal Sampling Strategies for Quicksort', Proc 28 Allerton Conference on Communication Control and Computing (1991) 62–71.

A generalisation of Quicksort which employs a random sampling scheme to select several pivots used in the sorting process is described in IBM Technical Disclosure Bulletin Vol 15, No 3 8/72 pp 1009–1011. However, in this method, once the pivots are selected they require sorting and the bucket of any given key can only be determined via a binary search. The time cost of performing a binary search for a typical key value for M buckets is of the order of log M. In other words, the time cost of determining the bucket grows logarithmically with the number of buckets used. Therefore, to sort N inputs the expected computing time for the method is proportional to N log N.

The object of this invention is to overcome the drawbacks of the prior art and provide an improved sorting method.

SUMMARY OF THE INVENTION

The invention provides a method for operating a computer to sort a set of data records each having an associated key for governing the sort process, the method comprising determining a range for the key values by sampling the key values; defining a plurality of buckets, each bucket corresponding to a respective one of a plurality M of subintervals in the range, and two edge buckets for key values outside the range, each subinterval having a respective index; distributing the keys among the buckets by determining directly from each key value the index of the subinterval into which the key value falls; and processing the buckets in sequence in order to sort the records, sorting the keys in each bucket if the bucket contains more than one key.

The inventors have shown theoretically that for most practical cases using this statistical approach, the expected computing time of theft method is linear, with a small coefficient, in the number of records N. This provides a significant improvement over existing sorting methods which require an expected sorting time of the order of $Nlog_2N$. In practice also, the method has been found to be significantly faster than the QuickSort Algorithm.

This improvement arises, at least in part, from the fact that the index of the subinterval into which each key falls is determined directly from the key value. This means that the distribution of each key into the respective bucket can be performed in a time which does not depend on the number of buckets used in the distribution.

Preferably, the size and spacing of the subintervals are chosen so that the probability of more than one key value falling into each subinterval is low. In this way, after the distribution most of the bins will contain either zero or one element and the amount of sorting which is required after the keys are distributed is minimal.

In a preferred embodiment the subintervals are equal and the step of determining the index of the subinterval into which any key fills from the key value is carried out using a bit shift operation. This provides a particularly efficient implementation since the indexes of the subintervals can be calculated using only 3 operations—a subtraction, a shift and a comparison.

To further improve the performance in this case, if the bit shift is of L bits, the method can comprise setting the lowest L bits of the lower bound for the range to zero and, after distribution of the keys into the buckets, removing a common prefix from the keys in the buckets containing more than one key.

As a further preferred feature, the method can comprise determining from the key samples whether a substantial number of the keys share a common prefix, and, if so, dividing the keys into subsets, one of which comprises all keys sharing the common prefix and sorting the key subsets separately.

Also provided is data processing apparatus for sorting a set of data records each having an associated key for governing the sort process, the apparatus comprising means for determining a range for the key values by sampling the key values; means for defining a plurality of buckets, each bucket corresponding to a respective one of a plurality M of subintervals in the range, and two edge buckets for key values outside the range, each subinterval having a respective index; and means for distributing the keys among the buckets by determining directly from each key value, the index of the subinterval into which the key value falls, the apparatus being arranged to processing the buckets in sequence in order to sort the records, sorting the keys in each bucket if the bucket contains more than one key.

BRIEF DESCRIPTION OF THE DRAWINGS

An embodiment of the invention will now be described, by way of example only, with reference to the accompanying drawing, wherein.

DETAILED DESCRIPTION OF THE PREFERRED EMBODIMENT

Figure 1:
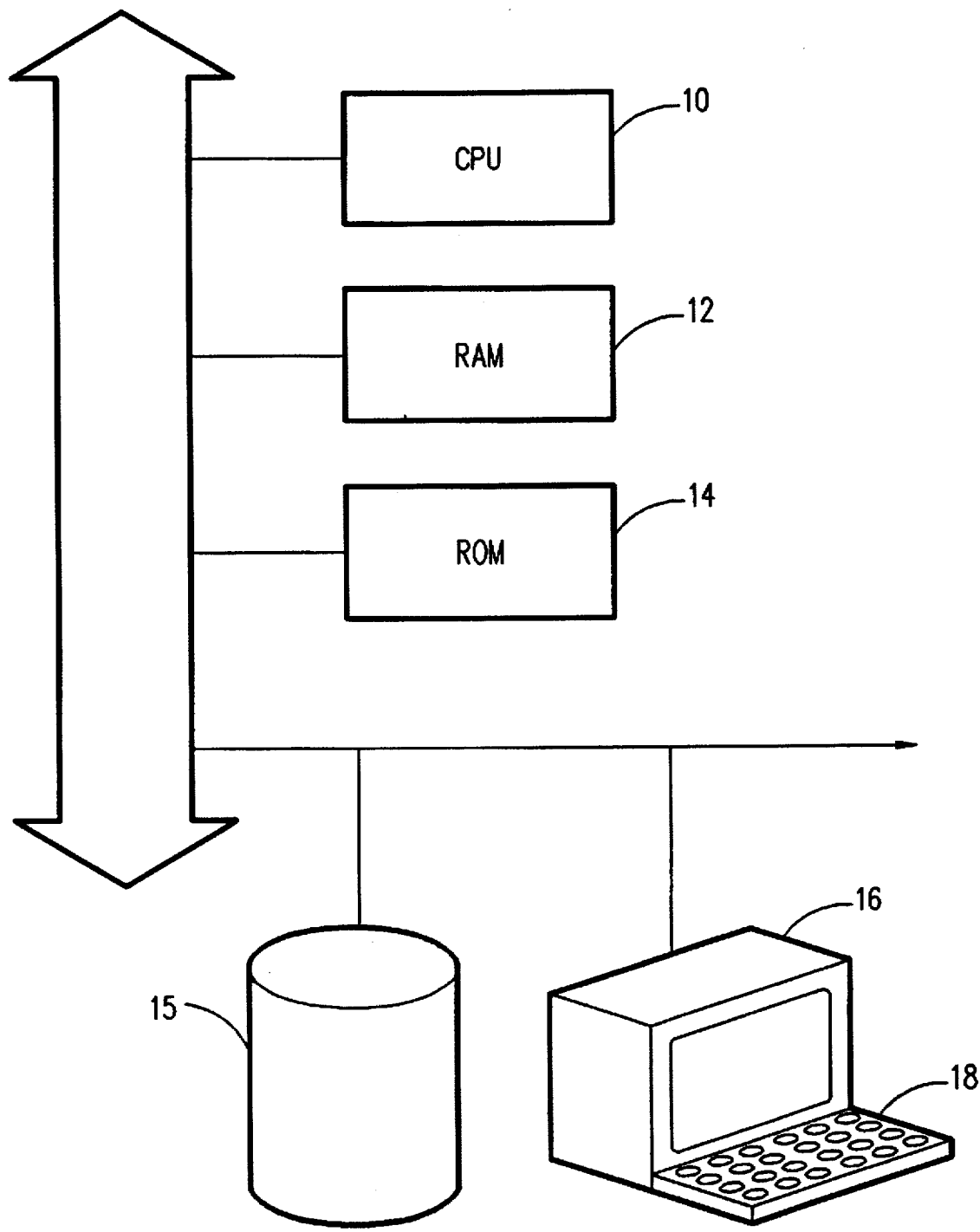
FIG. 1 is a schematic diagram of a computer system implementing this invention.
Figure 2:
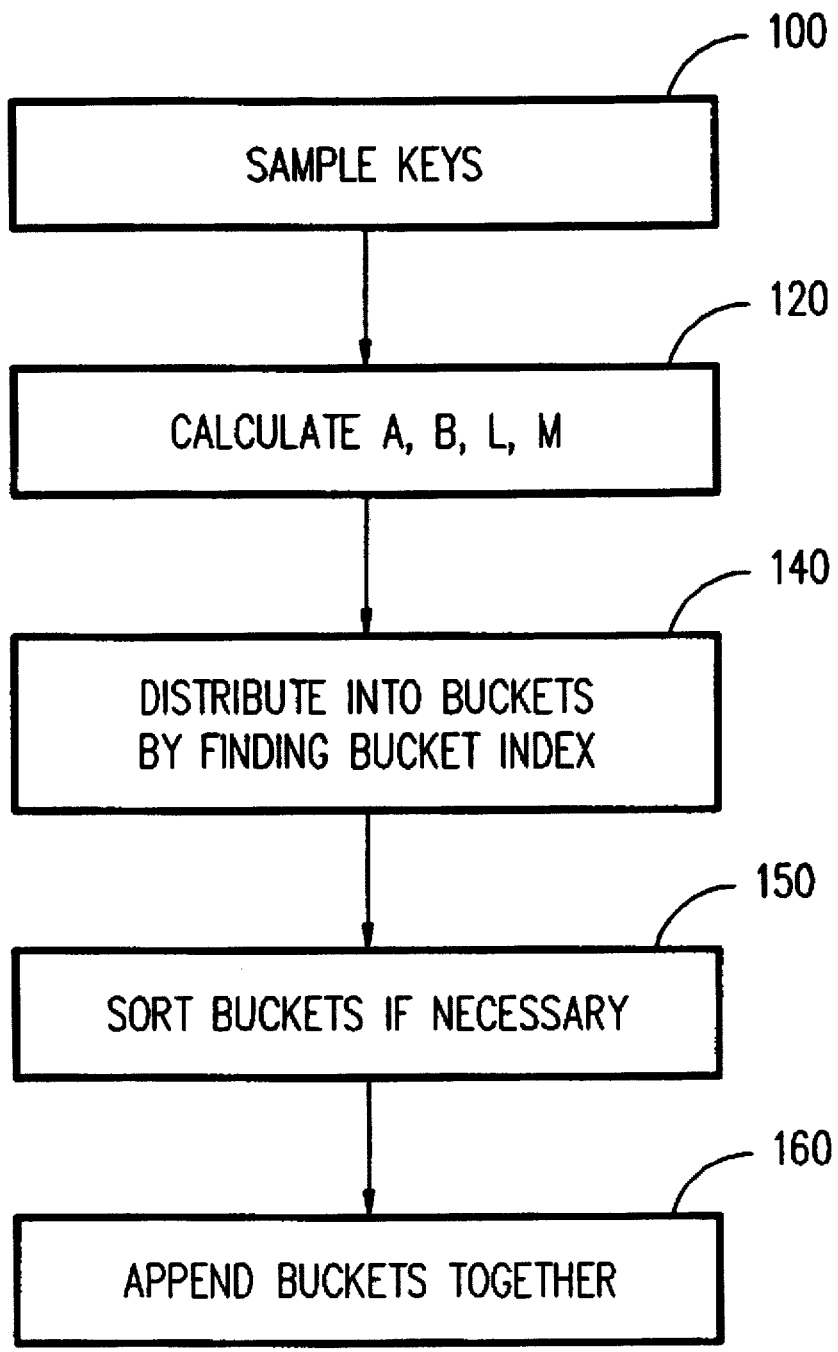
FIGS. 2 and 4 are flow diagrams showing sorting processes.

Referring to FIG. 1, the data processing system which may be utilized for implementing the method and system of the present invention includes a processor 10, a random access memory (RAM) 12, a read only memory (ROM) 14, at least one non-volatile storage device 15, a computer display monitor 16 and a keyboard 18.

There are many variations of the computer system shown in FIG. 1 known to those skilled in the art for providing the data processing system used in the present invention.

The invention specification procedures may be implemented using standard programming and/or engineering techniques. The resulting program or programs may be stored on disk, diskettes, memory cards, ROM or any other memory device. For execution, the program may be copied into the RAM of the storage management system server. One skilled in the art of computer science will easily be able to combine the software described with appropriate general purpose or special purpose computer hardware to create a computer system embodying the invention.

The basic sorting method, which will be referred to in the following as 'sorting by intervals' is illustrated in FIG. 1 and consists of two phases:

1. Preprocessing. In this phase a sample is taken in step 100 from the file to be sorted in order to estimate the range of key values in the file. The range is divided into subintervals which serve as buckets for the sorting process.

2. Sorting. For each key, it is determined in step 140 via a fast operation to be described below the index of the subinterval in which the item lies and the keys are distributed into the buckets. If more than one record belongs to a subinterval, the items in the subinterval are sorted in step 150 using any suitable sorting method, which may be either a conventional sorting method, such as QuickSort or a recursive application of sorting by intervals. Finally the whole file is placed in order by appending the records from each sub-interval in order in step 160.

These stages are described in more detail below:

The Preprocessing Phase

The file to be sorted comprises N records each of which has an associated key. The key values are denoted $x_1, x_2, \ldots x_N$. In this embodiment the key values $x$ are 32 bit binary numbers. Of course, each key also comprises a suitable pointer or the like identifying its associated record. The preprocessing phase consists of the following three steps:

1. A random sample of the keys is taken from the file $y_1, y_2, \ldots y_n$. In the preferred embodiment n is chosen to be of the order of the square root of N for small N, but is kept constant at approximately 100 for larger N.

The random sampling can be achieved, for example, by taking a predetermined set of n indices, for example from a pseudo-random table, and picking the corresponding elements. For example, it is possible to use a fixed sequence of numbers $k_1, k_2, \ldots k_n$, which are randomly sampled in (−50, 50). Then index (j) can be determined from the relation:

$$index(j) = 50 + j \times IDEL + k_j$$

where IDEL is defined as the smallest integer less than or equal to N/n.

2. The maximum and minimum of the sample are calculated and a range (A,B) is determined as follows:

$$A = \max y - (\max y - \min y)\left(\frac{n+1}{n-3}\right)$$

$$A = \min y + (\max y - \min y)\left(\frac{n+1}{n-3}\right)$$

This corresponds to a 3 sigma confidence interval for A and B in the case of a uniform distribution. The last L bits of A are set to zero in order to ensure, as explained below, that all keys in any one bucket share a common prefix of 32−L bits.

3. The number of subintervals M is calculated as follows. First an integer L is determined as shown below, then the number of subintervals M is calculated from L as follows, $$L = INT\left\{\log_2\left(\frac{B-A}{\alpha N}\right)\right\},$$

$$M = INT\left(\frac{B-A}{2^L}\right).$$

With these definitions M satisfies:

$$\alpha N \leq M < 2\alpha N.$$

This is because $$\log_2\left(\frac{B-A}{\alpha N}\right) - 1 < L \leq \log_2\left(\frac{B-A}{\alpha N}\right).$$

Thus, $$\frac{B-A}{2\alpha N} < 2^L \leq \frac{B-A}{\alpha N}.$$

In the above equations a is a parameter which can be tuned. It is usually selected in the range 1–3. It will be described below how the optimum a may be selected. One efficient method for obtaining M and L is to shift B-A right by one place until the result is less than $2\alpha N$. M is the result and L the number of places shifted.

The Sorting Phase

This phase consists of the following 3 steps:

1. Two arrays are defined. One array —H— is used to store headers for the buckets. The other —C— is used to store the contents of the buckets. Array H has M entries. Each entry consists of two pointers—one points to the slot in C in which the next element to land in the bucket will be stored, and the other points to the end of the space allocated in C for the contents of the particular bucket. The last slot of each bucket, i.e. the array slot pointed to by the pointer that points to the end of the space allocated for a single bucket, is used to store a pointer to the beginning of the bucket's array space. This is needed to allow the contents of the bucket to be located and copied in case the bucket overruns.

Figure 3:
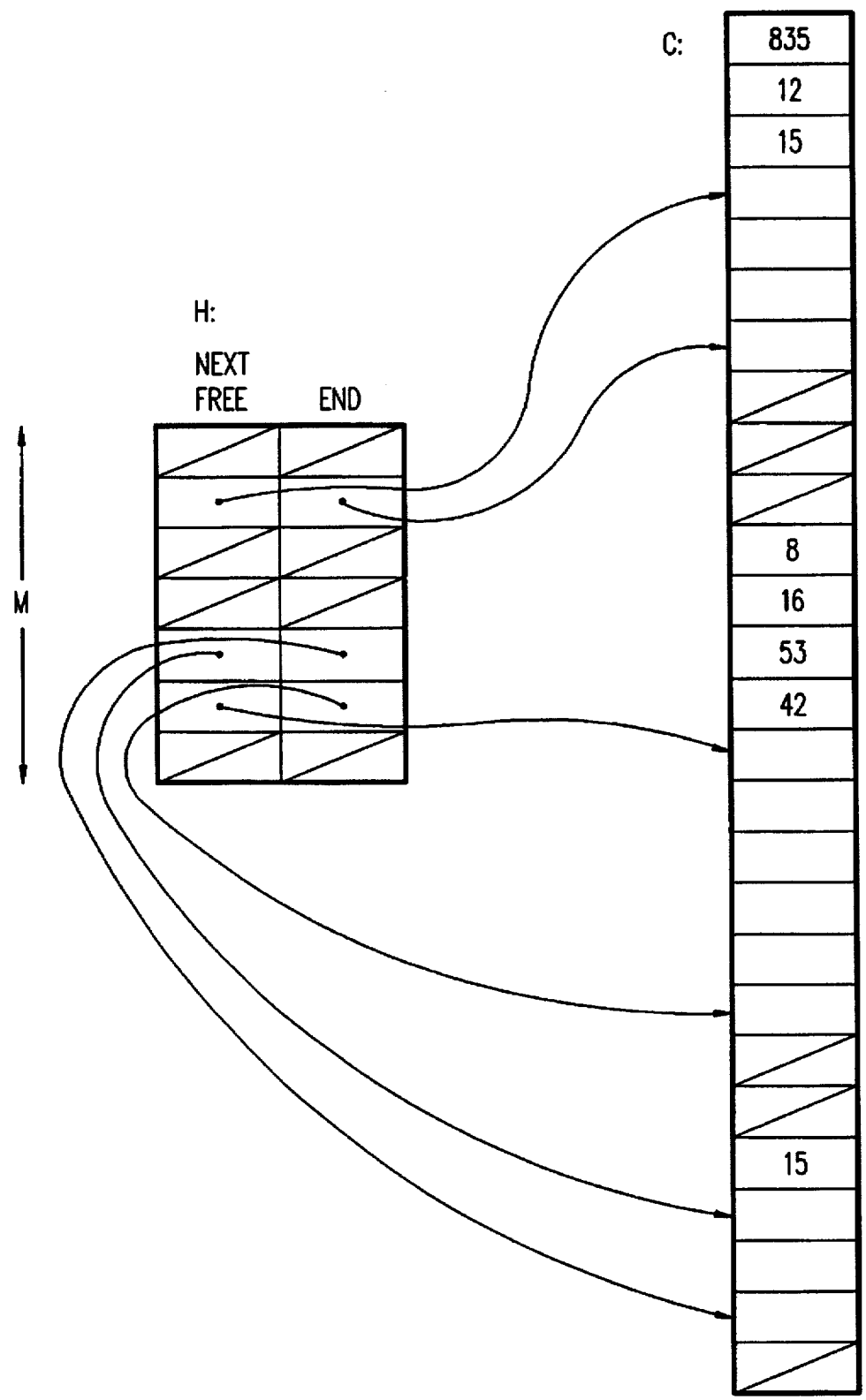
FIG. 3 is a schematic diagram showing data structures.

The contents of the buckets are stored contiguously in array C. When a bucket overruns the space allocated to it, a new space of double the current size is allocated to the bucket and its contents are copied to the new space. The structure of arrays H and C is shown schematically in FIG. 3.

2. The index of the subinterval to which each item $x_i$ of the file belongs to is determined using a fast procedure IND which calculates the following quantity:

$$ind = \max\{1, \min(M, INT((x_i - A) \times 2^{-L}))\}.$$

The exponentiation is executed via a shift fight L places operation, which is fast. This is effectively the operation $(x_i-A)>>L$, where the operator $>>$ stands for a right shift. It will be understood that processing time can be saved by avoiding the $-A$ and/or the $>>L$ operations when A and/or L are zero. The index calculation therefore effectively only requires 3 operations—a subtraction, a shift and a comparison.

In a preferred embodiment, the index is computed using the following steps:

(i) First A is subtracted from the key. If the key is treated as an unsigned integer, this causes all the numbers that lie in the (A, B) segment to be shifted to (0, B−A), while those that are outside the segment move to (B−A, MaxInt).

(ii) The result is then shifted right by L bits, and compared to $(B-A)/2^L$. In most cases, the result is smaller than the breakpoint and is used to index the bucket. For values outside the segment (A−B) an additional check is made to decide on one of the two edge buckets.

Since the last L bits of A are set to zero, any two key values falling into the same bucket are guaranteed to share a prefix of 32−L bits. This is for the following reasons: Denoting by d the last L bits of key D and by d' the string D>>L and the concatenation operator by |, then D=d'|d. Similarly A=a'|a etc. If two key values D=d'|d and E=e'|e are distributed to the same bucket with index h and A=a'|0, then D−A=d'|d−a'|0=(d'−A')|d and h=(d'−a'). Further E−A=(e'−a')|e, thus e'−a'=h. Therefore d'=e'=(a'+h). In other words D and E share the common 32−L bit prefix (a'+h).

The file is scanned sequentially and the IND procedure is executed for each item in the file. Pointers to all the file elements are placed into the array C in the buckets corresponding to the subintervals by reference to the array H at the index of the subinterval.

3. The bucket fie H is scanned and if $H_i=0$ then no action is taken, otherwise the corresponding $H_i$ is picked. If it is the only element in the bucket then the next bucket is processed. Otherwise the 32−L bit prefix common to the keys in the bucket is removed and all the elements in the bucket are sorted according to the magnitude of their L-bit suffix starting with the smallest. After this sorting procedure the following bucket is processed.

In practice 'sorting by intervals' is implemented as part of a general purpose sorting program for sorting files in which the length of the keys can be large, for example, 48 bytes. The keys are sorted recursively by sorting by the leading 4 bytes of the key in each iteration and then shortening the keys. Thus, in the sorting phase of sorting by intervals, the keys are distributed into buckets based on the leading 4 bytes of the keys and the parameters A and M chosen so that it is likely that all keys in the bucket will share the same 4-byte prefix. If all keys in a bucket share the same 4-byte prefix, then sorting can proceed for these keys based on the next 4 bytes of the key.

It will be understood that the use of 4-byte parts of the key to govern the sorting in each iteration is dependant on the particular computer architecture for which the method is implemented. Of course, as computer architectures shift towards wider registers, this could be appropriately adjusted.

Subsequently if more than 256 keys are in the same bucket, then sorting by intervals is applied recursively, otherwise the keys in the bucket are sorted using Quicksort. In practice no explicit recursive calls to the sort by intervals routine are made, rather pointers to the segments to be sorted are placed on a stack of outstanding work. The algorithm rims in a loop such that all the stages of sorting by intervals are performed in each iteration of the loop. As the collection of the buckets proceeds, if buckets are found to contain more than 256 keys, the elements of the bucket are copied back to the space of the input array and appropriate pointers are stored in the to-do stack for future processing. If the stack is found to be empty at the end of an iteration the algorithm terminates by exiting the loop. It will be understood however than many other implementations in software and/or hardware are possible.

Figure 4:
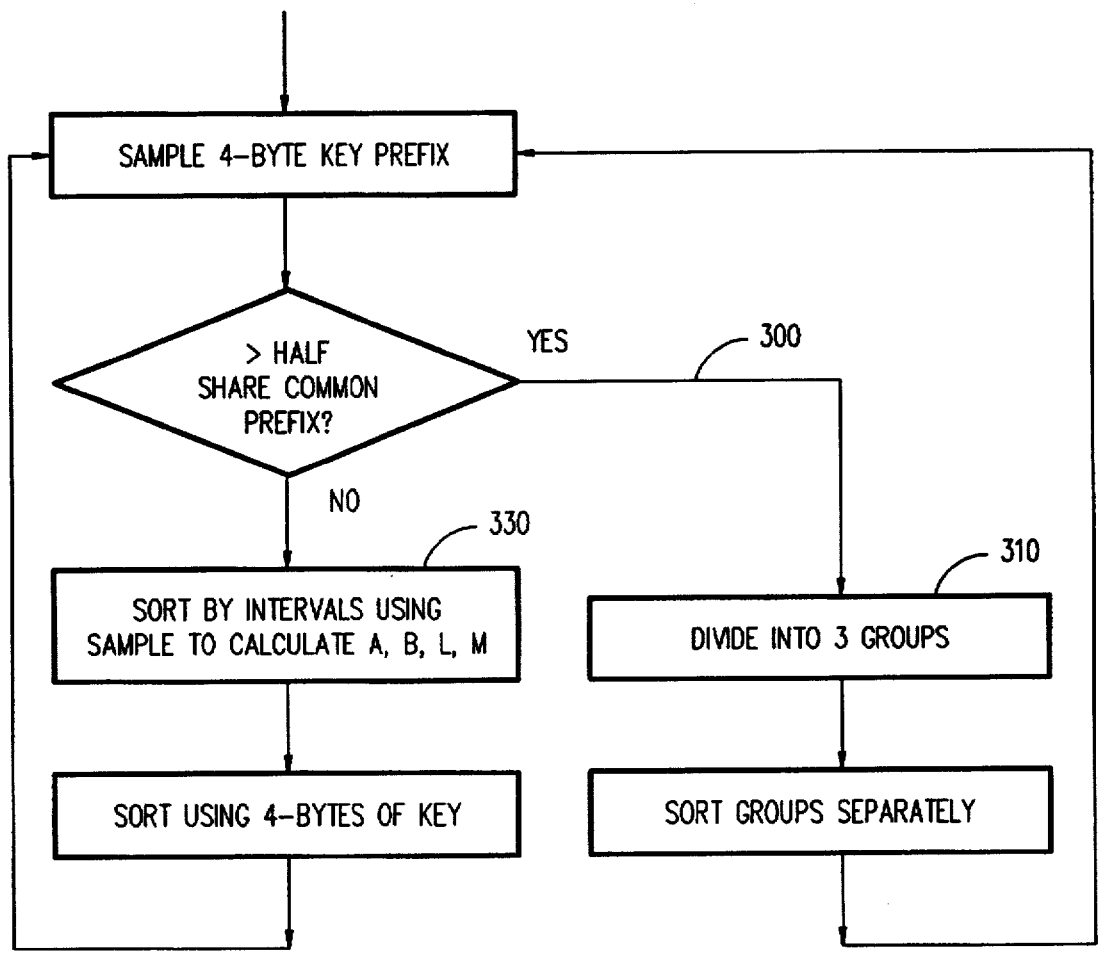

In a further embodiment as shown in FIG. 4, if more than half the keys in a sample to be sorted share the same 4-byte prefix (300), the data is split into three sets (310), one for the keys with the common prefix, one for the keys with a prefix which is smaller than the common prefix, and one for the keys with a prefix which is larger than the common prefix. Then the three sets are sorted separately using sorting by intervals.

If no 4 byte prefix is shared by half the keys in the sample, then sorting by intervals is applied to the whole of the data (330), as described above.

If the keys to be sorted are not uniformly distributed, it will be understood that the method could include a suitable preprocessing step to reduce clustering of the keys.

The following presents some analytic and experimental results concerning the distribution of random data elements into buckets which are used to estimate the performance of the method.

For a random, uniformly distributed, file the Poisson probability distribution can be used to calculate the distribution of the elements into the buckets because the number of elements in each interval can be determined by N Bernoulli trials with a small probability of success, 1/M, for each trial. The proportion of intervals with i elements is:

$$P(i)=(r^i/i!)\times exp\{-r\}, i=0,1$$

where r=N/M.

The computational cost associated with the method can be measured by the number of cycles required for sorting the file. Assuming that each interval with i elements in it adds $a_i$ to the computational cost, then it is required to minimise the total computational cost $$cost = M \times \left( \sum_{i=0}^{N} a_i \times P(i) \right) + overhead$$

The inventors have found that the overhead can be expressed approximately as $$overhead=M+8N$$

and that $a_i$ can be approximated as $$a_i=1-2i+6i^2$$

Under the Poisson distribution $$\sum_{i=0}^{\infty} iP(i) = r, \sum_{i=0}^{\infty} i^2 P(i) = r - r^2$$

Thus for a large N, the computation cost is for practical purposes equal to $$cost=(M+8N)+M\times(1-2r+6(r+r^2))=N\times(12+2/r+6r)$$

The minimum value of cost is 19N and is obtained for $$r = \frac{1}{\sqrt{3}}$$

and the function is near optimal for $0.4 \geq r \geq 0.8$ which corresponds to M from 1.25N to 2.5N. This corresponds to $\alpha=1.25$. It should be noted that the optimal value of a does not depend on N. The inventors have verified this by tuning the parameter a in their implementation and found the optimal value to be 1.25.

While the invention has been particularly shown and described with reference to the preferred embodiment, it will be understood that various changes of form and detail may be made without departing from the spirit and scope of the invention as defined by the appended claims.

We claim:

1. A method for operating a computer having a processor and memory to sort a set of data records stored in the memory each record having an associated key for governing the sort process, the method comprising the steps performed by the computer of:
   (a) determining a calculated minimum and maximum for the key values by sampling the key values;
   (b) defining a plurality of buckets, each bucket corresponding to a respective one of a plurality M of subintervals between the calculated minimum and maximum, and two edge buckets for key values outside the range, each subinterval having a respective index;
   (c) distributing the keys among the buckets by determining directly from each key value, the index of the subinterval into which the key value falls; and
   (d) processing the buckets in sequence in order to sort the records, sorting the keys in each bucket when the bucket contains more than one key.

2. A method as claimed in claim 1, wherein the subintervals are equal.

3. A method as claimed in claim 1, wherein the step of determining the index of the subinterval into which any key falls from the key value is carried out using a bit shift operation.

4. A method as claimed in claim 3 wherein the bit shift is of L bits, the method comprising setting the lowest L bits of the lower bound for the range to zero and, after distribution of the keys into the buckets, removing a common prefix from the keys in the buckets containing more than one key.

5. A method as in claim 1, wherein $$M = INT\left(\frac{B-A}{2^L}\right)$$

where A and B are the calculated minimum and maximum and $$L = INT\left\{\log_2\left(\frac{B-A}{\alpha N}\right)\right\}$$

$\alpha$ being a parameter that is tuned.

6. A method as claimed in claim 5 wherein L and M are obtained by bit-shifting B−A right by one place until the result is less than $2\alpha N$.

7. A data processing apparatus for sorting a set of data records each having an associated key for governing the sort process, the apparatus comprising:
   means for determining a range of the key values by sampling the key values;
   means for defining a plurality of buckets, each bucket corresponding to a respective one of a plurality M of subintervals in the range, and two edge buckets for key values outside the range, each subinterval having a respective index;
   means for selecting the size and spacing of the subintervals so that the probability of more than one key value falling into a subinterval is low whereby after the distribution most of the buckets will contain either zero or one element: and
   means for distributing the keys among the buckets by determining directly from each key value the index of the subinterval into which the key value falls, the apparatus being arranged to processing the bucket in sequence in order to sort the records, sorting the keys in each bucket if the bucket contains more than one key.

8. A method for operating a computer having a processor and memory to sort a set of data records stored in the memory each record having an associated key for governing the sorting of the set of data records, the method comprising the steps performed by the computer of:
   (a) determining a range for the key values by sampling the key values;
   (b) defining a plurality of buckets, each bucket corresponding to a respective one of a plurality M of subintervals in the range, and two edge buckets for key values outside the range, each subinterval having a respective index;
   (c) distributing the keys among the buckets by determining directly from each key value the index of the subinterval into which the key value falls;
   (d) processing the buckets in sequence in order to sort the records, sorting the keys in each bucket when the bucket contains more than one key; and
   (e) determining from the key samples whether a substantial number of the keys share a common prefix, and, if so, dividing the keys into subsets, one of which comprises all keys sharing the common prefix and sorting the key subsets separately.

9. An article of manufacture for use in a computer system for sorting a set of data records, the computer system having a processor and memory wherein the set of data records are stored in the memory, each record having an associated key for governing the sorting of the set,
   said article of manufacture comprising a computer readable storage medium having a computer readable programming code embodied in said medium which causes the computer to:
   determine a range for the key values by sampling the key values;
   define a plurality of buckets, each bucket corresponding to a respective one of a plurality M of subintervals in the range, and two edge buckets for key values outside the range, each subinterval having a respective index, wherein the size and spacing of the subintervals are selected so that the probability of more than one key value falling into a subinterval is low, whereby after the distribution most of the buckets will contain either zero or one element;
   distribute the keys among the buckets by determining directly from each key value the index of the subinterval into which the key value falls; and
   process the buckets in sequence in order to sort the records, sorting the keys in each bucket if the bucket contains more than one key.

10. A method for operating a computer having a processor and memory to sort a set of data records stored in the memory each record having an associated key for governing the sorting of the set of data records, the method comprising the steps performed by the computer of:

(a) determining a range for the key values by sampling the key values;

(b) defining a plurality of buckets, each bucket corresponding to a respective one of a plurality M of subintervals in the range, and two edge buckets for key values outside the range, each subinterval having a respective index, wherein the size and spacing of the subintervals are selected so that the probability of more than one key value falling into a subinterval is low, whereby after the distribution most of the buckets will contain either zero or one element;

(c) distributing the keys among the buckets by determining directly from each key value the index of the subinterval into which the key value falls; and (d) processing the buckets in sequence in order to sort the records, sorting the keys in each bucket when the bucket contains more than one key.

11. A method as claimed in claim 10, wherein the subintervals are equal.

12. A method as claimed in claim 10, wherein the step of determining the index of the subinterval into which any key falls from the key value is carried out using a bit shift operation of L bits, the method comprising setting the lowest L bits of the lower bound for the range to zero and, after distribution of the keys into the buckets, removing a common prefix from the keys in the buckets containing more than one key.

13. A method as in claim 10, wherein $$M = INT\left(\frac{B-A}{2^L}\right)$$

where A and B are the boundaries of the range and $$L = INT\left\{\log_2\left(\frac{B-A}{\alpha N}\right)\right\}$$

being a parameter that can be tuned.

14. A method as claimed in claim 13, wherein L and M are obtained by bit-shifting B−A right by one place until the result is less than $2\alpha N$.

* * * * *